United States Patent
Blanchard et al.

(10) Patent No.: US 6,554,931 B1
(45) Date of Patent: Apr. 29, 2003

(54) ULTRASONIC WELDING APPARATUS

(75) Inventors: Daniel Blanchard, Neuvy en Sullias (FR); Patrick Faul, Chateauneuf sur Loire (FR)

(73) Assignee: Masterfoods SCS, Lieudit Saint Nicolas (FR)

( * ) Notice: Subject to any disclaimer, the term of this patent is extended or adjusted under 35 U.S.C. 154(b) by 0 days.

(21) Appl. No.: 09/806,914

(22) PCT Filed: Oct. 6, 1999

(86) PCT No.: PCT/IB99/01703
§ 371 (c)(1),
(2), (4) Date: Jul. 9, 2001

(87) PCT Pub. No.: WO00/20191
PCT Pub. Date: Apr. 13, 2000

(30) Foreign Application Priority Data

Oct. 6, 1998 (FR) .............................................. 98 12491

(51) Int. Cl.⁷ .............................................. B29C 65/08
(52) U.S. Cl. .................... 156/73.3; 156/73.1; 156/251; 156/269; 156/308.4; 156/515; 156/580.2; 428/58
(58) Field of Search .............................. 156/73.1, 73.3, 156/250, 251, 267, 269, 308.2, 308.4, 510, 515, 530, 580.1, 580.2; 428/57, 58

(56) References Cited

U.S. PATENT DOCUMENTS

| | | | | |
|---|---|---|---|---|
| 3,434,906 A | | 3/1969 | Greeve et al. .............. | 156/466 |
| 3,505,136 A | | 4/1970 | Attwood ...................... | 156/76 |
| 4,097,327 A | | 6/1978 | Calemard .................... | 156/515 |
| 4,478,661 A | * | 10/1984 | Lewis .......................... | 156/92 |
| 4,517,790 A | | 5/1985 | Kreager ....................... | 53/552 |
| 4,521,467 A | | 6/1985 | Berger ......................... | 428/35 |
| 4,534,818 A | | 8/1985 | Kreager et al. ............. | 156/466 |
| 4,663,917 A | | 5/1987 | Taylor et al. ................. | 53/552 |
| 4,711,693 A | * | 12/1987 | Holze, Jr. .................... | 156/580.1 |
| 4,909,870 A | | 3/1990 | Gould et al. ................. | 156/66 |
| 5,632,831 A | * | 5/1997 | Stull ........................... | 156/73.3 |
| 5,932,041 A | * | 8/1999 | Dolling et al. ............. | 156/73.3 |

FOREIGN PATENT DOCUMENTS

| | | |
|---|---|---|
| DE | 2922834 | 12/1980 |
| DE | 3034955 | 3/1982 |
| DE | 382112 | 1/1987 |
| DE | 8809048 | 9/1988 |
| DE | 19505298 | 8/1996 |
| EP | 0084903 | 8/1983 |
| EP | 0333390 | 9/1989 |
| FR | 2665683 | 2/1992 |
| GB | 952581 | 12/1962 |
| JP | 55-154119 | 12/1980 |
| JP | 63-315223 | 12/1988 |
| JP | 3-158227 | 7/1991 |

\* cited by examiner

*Primary Examiner*—James Sells
(74) *Attorney, Agent, or Firm*—Fitzpatrick, Cella, Harper & Scinto

(57) ABSTRACT

The invention relates to an ultrasonic welding apparatus (100) for welding together at least two superposed sheets (1, 2) made of plastics material and traveling continuously along a predetermined path (F), the apparatus (100) being of the type comprising a sonotrode (101) and an anvil (102) disposed facing each other so that their facing surfaces (101', 102') define a through gap (102) through which two superposed sheets (1, 2) to be welded together pass, the gap having an inlet section (104) and an outlet section (105), the sonotrode (101) vibrating at high frequencies to emit ultrasound waves. According to the invention, the anvil is fixed and said facing surfaces of the sonotrode and of the anvil are generally plane and converge towards each other such that the section of said through gap decreases continuously between its inlet section and its outlet section.

22 Claims, 2 Drawing Sheets

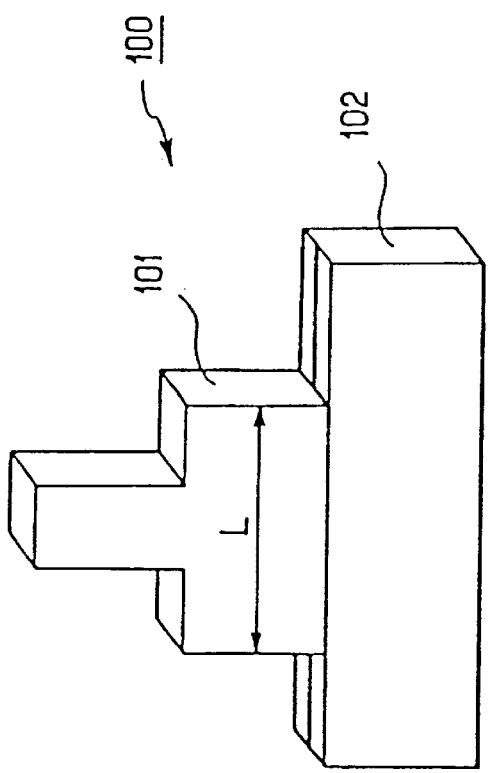
FIG_1
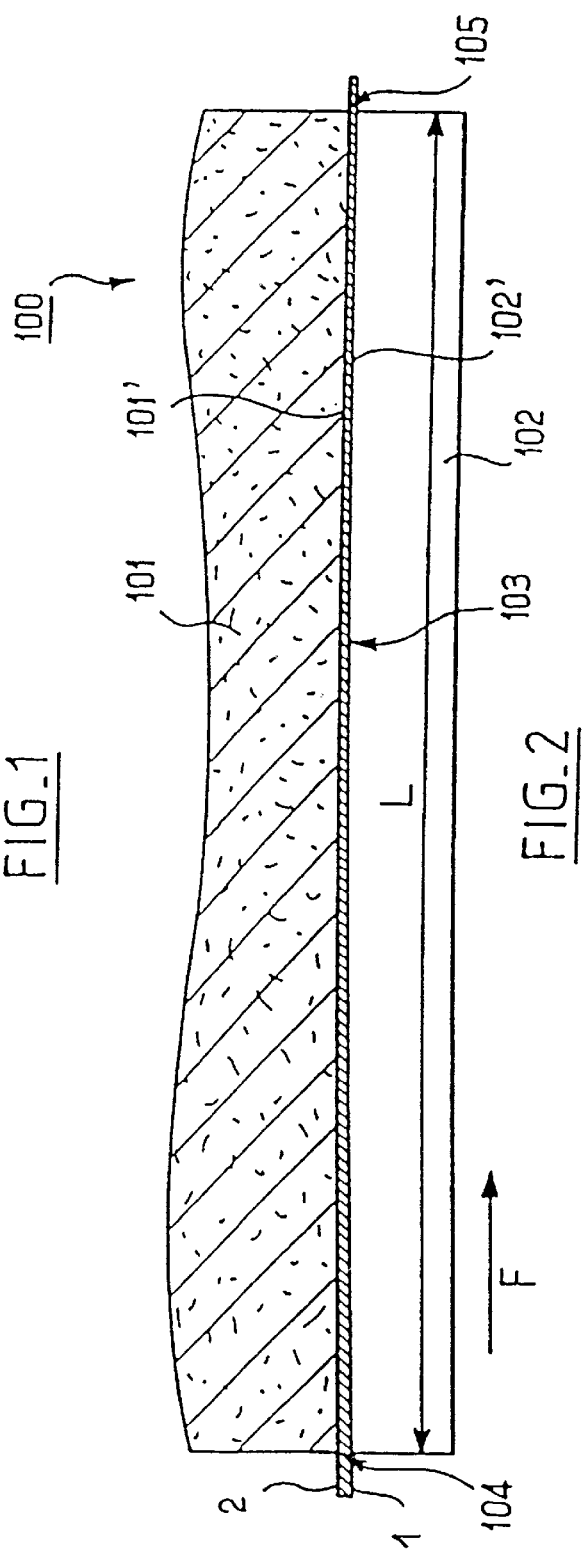
FIG_2

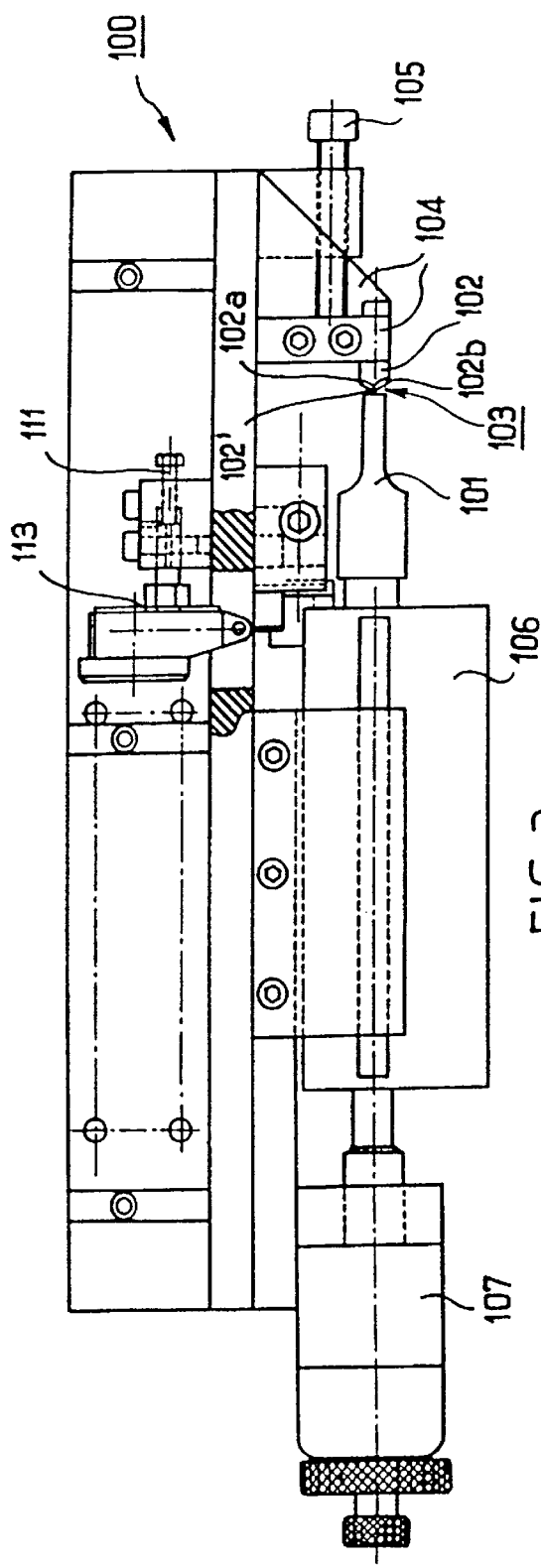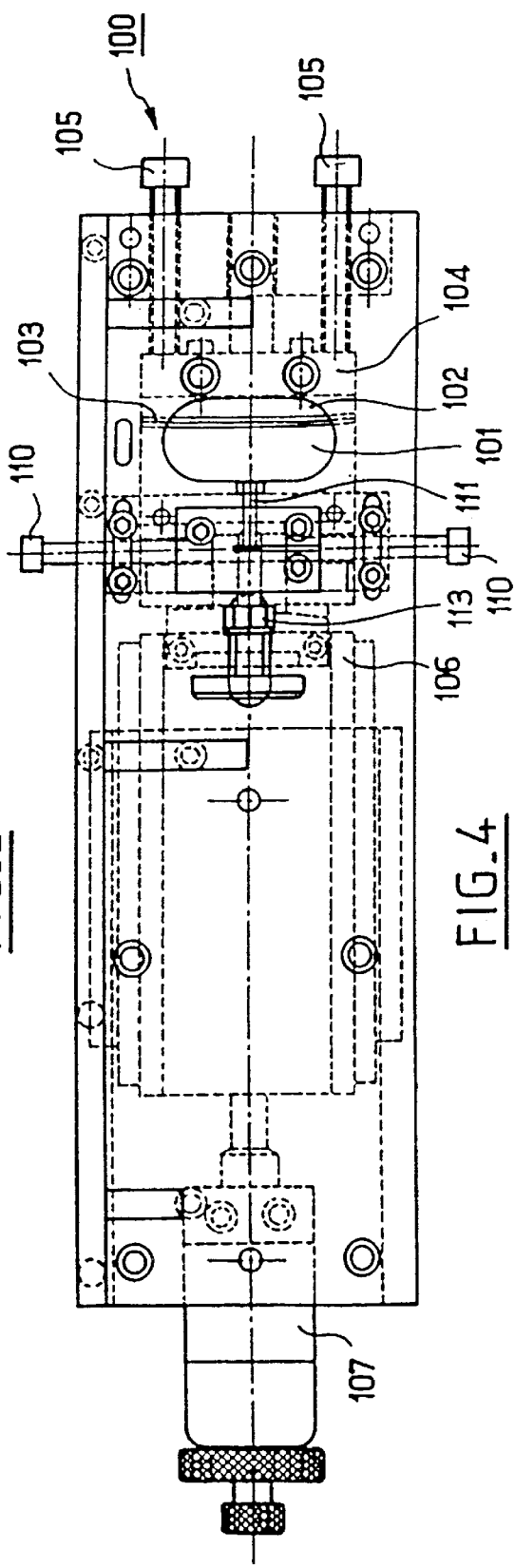

ULTRASONIC WELDING APPARATUS

The present invention relates to apparatus for untrasonically welding together at least two superposed sheets, the sheets being made of plastics material and travelling continuously along a determined path.

More particularly, the invention relates to apparatus of the type comprising a sonotrode and an anvil placed facing each other so that their facing surfaces define a through gap through which the two superposed sheets to be welded together pass, the gap having an inlet section and an outlet section, and the sonotrode vibrating at high frequencies to emit ultrasound waves.

The invention also relates to a method of closing flexible packages by welding by means of the above-mentioned ultrasonic welding apparatus, and specifically packages that are to be subjected to conservation treatment, in particular after they have been filled and closed, each package having two flanks joined together via their side edges, each flank having an inside face and an outside face of plastics material and a central layer of light metal sandwiched between the inside and outside faces.

The invention also relates to a flexible package, specifically that is to be subjected to conservation treatment, in particular after it has been filled and closed, the package comprising two flanks joined together via their side edges, each flank having an inside face and an outside face of plastics material and a central layer of light metal sandwiched between the inside face and the outside face, which package is closed specifically by such a method.

A particularly advantageous application of the invention lies in closing small bags or sachets containing foodstuffs, in particular foodstuffs for animals, such bags or sachets being designed to be closed hermetically and to be subjected to heat treatment after they have been filled and closed.

At present, such packages come in various forms.

They can be flat, having three or four lines of welding, or they can have bellows, with three heat-welded sides and a bellows-shaped heat-welded bottom.

Such packages can also have two side bellows or two bellows positioned respectively at the top and the bottom of the package, together with side edges that are heat-welded.

These packages can be sterilized by being heated in a humid atmosphere and under pressure.

In order to be able to withstand heat treatment, they are made from one or more films of a special structure.

More particularly, they are generally manufactured from one or more films, with each film comprising a top layer and a bottom layer that are to constitute the outside face and the inside face of said packages made out of plastics material, together with a central layer sandwiched between said top and bottom layers, the central layer being made of light metal.

The top layer is generally a layer of polyethylene terephthalate, optionally associated with a layer of polyamide.

The central layer is made of aluminum, and the bottom layer is a layer of polypropylene, optionally associated with a layer of polyamide.

Between the layers, respective coatings of adhesive are provided to bond the various layers together.

In addition, the layer of polyethylene terephthalate can be printed on its inside face in order to decorate the outside of said package.

As a general rule, the layer of polyethylene terephthalate is used as a print medium and it determines the outside appearance of the package.

The central layer of aluminum forms a barrier to gas, in particular oxygen, and to water vapor, so as to isolate the material contained inside the package from the outside.

The layer of polyamide constitutes an anti-puncture layer where necessary as a function of the subsequent application of the package, and the layer of polypropylene serves as a welding agent for assembling the package, provides the general mechanical strength of the package, and also provides leakproof sealing at the lines of welding of said package.

Such packages can contain solids of a moist nature, liquids, or indeed an association of solids and liquids.

The open packages are initially filled and then closed by means of clamps which pull on their lateral edges so as to move the top edges of their flanks towards each other.

The packages are generally closed by conduction welding applied to the close-together top edges of the flanks of each package with the internal layer of polypropylene on each flank being heated by conduction through the central aluminum layer.

After conduction welding, cooling is applied to reinforce the weld provided in this way.

The line of welding made by such a method is generally at least 6 mm wide (in a vertical direction) in order to guarantee that it is strong enough and that the sealing is leakproof for the subsequent stage of sterilizing said small bags.

That method of heating by conduction makes it possible to close packages that are travelling stepwise one after another along a manufacturing line, at a rate of 120 packages per minute (this rate corresponds to a package that is 95 mm wide with the distance between two packages being 125 mm).

This rate is the maximum rate that can be achieved with that method. Thus, if it is desired to increase throughput, it is necessary to provide a plurality of manufacturing lines in parallel, which is expensive.

Indeed, that method of conduction welding using static hot jaws puts a limit on throughput specifically because of the stepwise welding technique implemented. Even if two packages were advanced simultaneously on each step, the method would encounter mechanical limits on operation due in particular to the fact that it is necessary to decelerate and then accelerate the packages before and after the welding station, and the system has a certain amount of inertia.

In order to increase the rate at which such packages or small bags can be sealed, e.g. to go from 120 packages/min to 500 packages/min, attempts have been made to use ultrasonic welding apparatus on packages that are travelling continuously.

In this field, ultrasonic welding apparatuses are already known form documents GB-A-952 581, EP 084 903, and EP 333 390, which apparatuses are suitable for joining together at least two superposed sheets of plastics material that are travelling continuously along a determined path.

The ultrasonic welding apparatuses described in the above-specified documents share the common characteristic of a gap through which the two superposed sheets to be welded together pass, which gap is defined between the facing surfaces of the sonotrode and the anvil, and has a section which decreases and then increases going from its inlet towards its outlet.

In document EP 0 333 390, that configuration for the section of the through gap is implemented solely so that the pressure applied by the sonotrode and the anvil on the surfaces to be welded together is homogeneous over the entire length of the welding gap.

In addition, in those apparatuses, and in particular in the apparatuses described in documents EP 084 903 and GB-A-952 581, provision is made for the anvil to be in the form of a cylinder that is rotated about its own axis, thereby putting a limit on the time the anvil and the sonotrode are in contact with the superposed films in the welding station. Thus, at high rates of throughput, the welding that is achieved is not entirely leakproof.

Compared with the state of the art, the present invention proposes a novel ultrasonic welding apparatus as defined in the introduction, which makes it possible to perform leakproof welding at a high rate of throughput between superposed sheets made of plastics material without running the risk of damaging said sheets as they pass through the gap provided between the sonotrode and the anvil of the welding apparatus.

More particularly, in the welding apparatus of the invention, the anvil is fixed and said facing surfaces of the sonotrode and of the anvil are generally plane and converge towards each other such that the section of said through gap decreases continuously between its inlet section and its outlet section.

Advantageously, the inlet section of the through gap defined between the sonotrode and the anvil is greater than the outlet section of said gap by a factor lying in the range 1.2 to 2, approximately.

The height of the inlet section of the through gap is slightly greater than the thickness of the superposed sheets to be welded together.

This makes it possible to facilitate entry of the superposed sheets into said through gap.

In the apparatus of the invention, for superposed sheets to be welded together that are travelling at a determined speed, provision is made in accordance with a preferred characteristic for the through gap defined between the sonotrode and the anvil to present a length that is determined as a function of said determined speed so that the contact time of the vibrating sonotrode and of the anvil with said sheets is selected so as to obtain leakproof welding together of the sheets over a given welding width.

According to other advantageous but non-limiting characteristics of the welding apparatus of the invention, the surface of the anvil facing the sonotrode, presents a pointed profile formed by two sloping flats that between them form an obtuse angle.

The resulting line of welding between two sheets has a width of about 1 millimeter.

In the welding apparatus of the invention, an actuator or a counterweight is provided in association with the sonotrode so that it exerts a determined pressure on the sheets to be welded together, which pressure lies in the range $0.2 \times 10^5$ Pa to $6 \times 10^5$ Pa.

The sonotrode vibrates at a frequency lying in the range about 20 kHz to 40 kHz and at an amplitude lying in the range $10 \mu m$ to $100 \mu m$, and preferably equal to about $70 \mu m$.

The travel speed of the sheets to be welded together lies in the range 50 meters per minute (m/min) to 150 m/min, and preferably in the range 60 m/min to 80 m/min.

The present invention also provides a method of closing flexible packages by welding, specifically packages that are to be subjected to conservation treatment, in particular after they have been filled and closed, each package having two flanks connected together via their side edges, each flank having an inside face and an outside face of plastics material and a central layer of light metal sandwiched between the inside and outside faces, which method is characterized in that welding apparatus of the invention is used to perform ultrasonic welding together of the inside faces of the flanks of each package as it travels at a determined speed, the welding being along a line that extends at least over the major portion of the width of each package.

Advantageously, each line of welding extends over the entire width of each package.

In accordance with the method of the invention, when making said line of welding in each package, it is possible simultaneously to make a line of cut, using the sonotrode and the anvil which are adapted for this purpose.

In addition, according to a particularly advantageous characteristics of the method of the invention, prior to closing each package by ultrasonic welding, said flanks of each package are heated so as to soften the inside faces of the flanks of each package.

This heating can be performed by conduction, by injecting steam, etc.

In the method of the invention, the central layer of each flank of each package is made of aluminum, the inside face of each flank of each package has a layer of polypropylene, or indeed a layer of polyamide and a layer of polypropylene.

The outside face of each flank of each package comprises a layer of polyethylene terephthalate, or indeed an additional layer of polyamide.

Finally, the invention provides a flexible package as described above and closed using the method of the invention.

The following description with reference to the accompanying drawings given as non-limiting examples, will make it easy to understand what the invention consists in and how it can be implemented.

In the accompanying drawings:

FIG. 1 is a diagrammatic perspective view of the sonotrode and the anvil of the ultrasonic welding apparatus of the invention;

FIG. 2 is a diagrammatic section view showing detail of the sonotrode and the anvil of the ultrasonic welding apparatus of the invention at ten times lifesize; and FIGS. 3 and 4 are a diagrammatic side and plan view of the ultrasonic welding apparatus of the invention.

In the figures, there is shown ultrasonic welding apparatus 100 for welding together at least two superposed sheets 1 and 2 made of plastics material, e.g. polypropylene, travelling continuously along a determined path F.

The apparatus 100 comprises an anvil 102 and a sonotrode 101 which vibrates at high frequencies to emit ultrasound waves.

The sonotrode 101 and the anvil 102 are placed facing each other so that their facing surfaces 101' and 102' define a through gap 103 for two superposed sheets 1, 2 to be welded together, said through gap having an inlet section 104 and an outlet section 105.

In the example shown (see FIGS. 3 and 4), the sonotrode 101 and the anvil 102 extend in a generally horizontal plane and the superposed sheets for welding together are intended to travel in a plane that is generally vertical.

Naturally, it is possible in a variant (not shown) for the sonotrode and the anvil to be disposed vertically with the superposed sheets to be welded together travelling in a horizontal plane.

The width of the inlet section 104 to the through gap 103 is slightly greater than the thickness of the superposed sheets 1 and 2 to be welded together. In this case, the thickness of the superposed sheets to be welded together is about $200 \mu m$, and the width of the inlet section 104 is equal to about $220 \mu m$. This enables the sheets to be welded together to enter easily into the through gap provided between the sonotrode and the anvil of the ultrasonic welding apparatus.

According to a particularly advantageous characteristic of the ultrasonic welding apparatus 100, the anvil 102 is fixed and the facing surfaces 101' and 102' of the sonotrode 101 and the anvil 102 are generally plane, converging towards each other so that the section of said through gap 103 decreases continuously from its inlet section 104 to its outlet section 105.

In the particular example described, the inlet section 104 of the through gap 103 is greater than the outlet section 105 of said gap 103 by a factor of about 1.3.

Thus, the width of the outlet section 105 of said gap 103 is about 170 μm, in this case. This width of 170 μm gives the line of welding made by the welding apparatus a thickness of about 135 μm.

For superposed sheets 1 and 2 travelling at a determined speed, the length L of the through gap 103 defined between the sonotrode 101 and the anvil 102 is determined as a function of the constant or variable determined speed of travel of said sheets so that the time the vibrating sonotrode and the anvil 102 remain in contact with the sheets 1 and 2 is selected to obtain leakproof welding between the sheets over a determined width of welding.

In the example shown, the travel speed of said sheets is constant and about 62.5 meters per minute (m/min), thereby giving the through gap a length of about 75 mm for a contact time of about 72 ms and a line of welding that is about 1 mm wide.

As shown more particularly in FIG. 3, the surface 102' of the anvil 102 facing the sonotrode 101 advantageously has a point-shaped profile formed by two sloping flats 102a and 102b forming an obtuse angle between each other. In this case, the angle formed between the sloping flats 102a and 102b is about 140 degrees.

In addition, each of the flats 102a and 102b of the anvil forms an angle a of about 20 degrees with the facing surface of the sonotrode.

Thus, with such welding apparatus a line of welding is formed in the two superposed sheets of plastics material having a thickness of about 135 μm and a width of about 1 millimeter.

According to other characteristics of the ultrasonic welding apparatus, as shown more particularly in FIGS. 3 and 4, the sonotrode 101 is mounted on a support 106 associated with an actuator 107 which acts on the sonotrode 101 so that it exerts a determined pressure on the sheets to be welded together, which pressure lies in the range $0.2 \times 10^5$ Pa and $6 \times 10^5$ Pa.

The sonotrode 101 vibrates at a frequency lying in the range 20 kHz to 40 kHz approximately and at an amplitude lying in the range 10 μm to 100 μm, and preferably equal to about 70 μm.

Adjustment screws 110 are provided for adjusting the position of the sonotrode relative to the anvil in the horizontal plane. A comparator 113 is also provided which enables the gap between the anvil 102 and the sonotrode 101 to be adjusted.

In addition, the adjustment screws 105 enable the angle between the sonotrode 101 and the anvil 102 to be adjusted.

This adjustment system makes it possible to adjust the relative positions of the sonotrode and the anvil as a function of the thicknesses of the sheets to be welded together, i.e. it makes it possible to adjust the widths of the inlet section and the outlet section of the through gap for said sheets.

Advantageously, the ultrasonic welding apparatus 100 can weld together superposed plastics material sheets travelling at a speed lying in the range 50 m/min to 100 m/min and preferably in the range 60 m/min to 80 m/min.

In another aspect of the invention, the above-described ultrasonic welding apparatus is used in a method of closing flexible packages by welding, specifically packages that are to be subjected to conservation treatment, in particular after they have been filled and closed, each package having two flanks joined together via their side edges, each flank having an inside face and an outside face of plastics material and a central layer of light metal sandwiched between the inside and outside faces.

Such flexible packages are advantageously sachets containing foodstuffs, in particular animal foods.

In the method of closure by welding, the packages travel along a bench, being placed vertically one after another, which implies that the sonotrode and the anvil are in a horizontal position, as shown in FIGS. 3 and 4.

Using said welding apparatus 100, the inside faces of the flanks of each package are welded together by ultrasound in the vicinity of the top edges of the flanks of the packages which are travelling at a determined speed which may be constant or variable. The welding extends along a line covering at least the major portion of the width of each package, and in particular along the entire width of each package.

The packages used in this case are such that the central layer of each of their flanks is made of aluminum, the inside face of each of their flanks has a layer of polypropylene or a layer of polyamide and a layer of polypropylene, and the outside face of each of their flanks comprises a layer of polyethylene terephthalate, optionally coated in an additional layer of polyamide.

The outside layer is designed to serve as a medium for decoration.

The ultrasonic welding apparatus as described with reference to FIGS. 1 to 4 makes it possible to weld together the inside faces of the flanks of each package through the outside face and the central layer.

Polypropylene has a melting temperature that is lower than the melting temperature of the layer of the outside face, and under the action of oscillations from the sonotrode, particles constituting the inside layer are excited and melt.

As described above, the line of welding of each package has a thickness of about 135 μm and a length of about one millimeter.

Advantageously, thank to the oscillations of the sonotrode against the sheets to be welded together, it is also possible, optionally, to remove particles of foodstuff that might remain at the location where the welding is to be performed, thereby ensuring that said package is welded in a leakproof manner.

Such apparatuses also makes it possible to close each package travelling at high speed through the welding station without spoiling the outside and central layers thereof.

According to an advantageous characteristic of the method of the invention, to accelerate the process of welding together the flanks of each package, it is possible, prior to closing each package by ultrasonic welding, to heat each flank of each package so as to soften the inside faces of the flanks of each package. This makes it possible to obtain leakproof welding of the films with greater flexibility concerning the relative positions of the anvil and of the sonotrode.

By way of example, the heating can be performed by conduction or by injecting steam.

Furthermore, it is possible to adjust the gap between the anvil and the sonotrode and also to adjust the pressure exerted between the sonotrode and the anvil on the flanks of each package to be welded, such that while the line of welding is being made in each package, a line of cut is being made simultaneously.

In the method described, it is also possible to envisage having two welding apparatuses as shown in FIGS. 1 to 4 placed on the travel path of the packages, at a determined distance apart and at different heights or at the same height so as to form a single line of welding or two juxtaposed lines of welding between the flanks of each package (one line of welding beneath the other).

Using the ultrasonic welding apparatus it is also possible, advantageously, to detect the quality of the welding or the presence of undesirable particles in the welding zone of each package by detecting the power consumed by the welding apparatus, with its power consumption being used as a detection signal.

Such a signal as picked up can be processed to identify and eject defective packages, i.e. packages which have been welded in non-leakproof manner.

Using the method, it is possible to close about 500 small bags per minute, which represents a considerable saving in the cost of manufacturing such bags.

The method using the apparatus of the invention also makes it possible to ensure that the welding between the flanks of bags that are in motion is leakproof. This is shown by Table 1 which gives the results of a biotest performed on bags welded by the method of the invention using various embodiments of the apparatus of the invention.

TABLE 1

| Bag speed (m/min) ← → 500 bags/min | Length of welding gap in apparatus of the invention (mm) | Contact time between sonotrode and anvil of apparatus of the invention | Biotest results, % bags proof against bacteria |
|---|---|---|---|
| 62.5 | 25 | 24 ms | 73% |
| 62.5 | 35 | 34 ms | 92% |
| 62.5 | 75 | 72 ms | 100% |

The present invention is not limited to the embodiments described and shown, and the person skilled in the art can apply any variation thereto within the spirit of the invention.

What is claimed is:

1. An ultrasonic welding apparatus (100) for welding together at least two superposed sheets (1, 2) made of plastics material and travelling continuously along a determined path (F), the apparatus (100) comprising a sonotrode (101) and an anvil (102) disposed facing each other so that their facing surfaces (101', 102') define a through gap (103) through which two superposed sheets (1, 2) to be welded together pass, the gap having an inlet section (104) and an outlet section (105), the sonotrode (101) vibrating at high frequencies to emit ultrasound waves, wherein the anvil (102) is fixed and said facing surfaces (101', 102') of the sonotrode (101) and of the anvil (102) are generally plane and converge towards each other such that the section of said through gap (103) decreases continuously between its inlet section (104) and its outlet section (105), and the surface (102') of the anvil (102) facing the sonotrode (101), presents a pointed profile formed by two sloping flats (102a, 102b) that between them form an obtuse angle.

2. The welding apparatus according to claim 1, wherein the inlet section (104) of the through gap (103) defined between the sonotrode (101) and the anvil (102) is greater than the outlet section (105) of said gap (103) by a factor lying in the range 1.2 to 2, approximately.

3. The welding apparatus according to claim 1, wherein a height of the inlet section (104) of the through gap (103) is slightly greater than a thickness of the superposed sheets (1, 2) to be welded together.

4. The welding apparatus according to claim 1, wherein for superposed sheets to be welded together that are travelling at a determined speed, the through gap (103) defined between the sonotrode (101) and the anvil (102) presents a length (L) that is determined as a function of said determined speed so that the contact time of the vibrating sonotrode (101) and of the anvil (102) with said sheets (1, 2) is selected so as to obtain leakproof welding together of the sheets over a given welding width.

5. The welding apparatus according to claim 4, wherein for a constant speed of about 62.5 meters per minute (m/min), the length of the through gap is equal to about 75 mm for a contact time of about 72 ms, and for a line of welding that is 1 mm wide.

6. The welding apparatus according to claim 1, wherein the sloping flats (102a, 102b) of the surface of the pointed profile of the anvil (102) form an angle of about 140 degrees.

7. The welding apparatus according to claim 6, wherein each of the sloping flats (102a, 102b) of the anvil (102) forms an angle of about 20 degrees relative to the face of the sonotrode (101).

8. The welding apparatus according to claim 1, wherein an actuator (107) or a counterweight is provided in association with the sonotrode (101) so that it exerts a determined pressure on the sheets (1, 2) to be welded together, which pressure lies in the range $0.2 \times 10^5$ Pa to $6 \times 10^5$ Pa.

9. The welding apparatus according to claim 1, wherein the sonotrode (101) vibrates at a frequency lying in the range about 20 kHz to 40 kHz and at an amplitude lying in the range 10 $\mu$m to 100 $\mu$m.

10. The welding apparatus according to claim 1, wherein a travel speed of the sheets to be welded together lies in the range 50 m/min to 150 m/min.

11. A method of closing flexible packages by welding, specifically packages that are to be subjected to conservation treatment, in particular after they have been filled and closed, each package having two flanks connected together via their side edges, each flank having an inside face and an outside face of plastics material and a central layer of light metal sandwiched between the inside and outside faces, the method comprising the step of ultrasonic welding together the inside faces of the flanks of each package as it travels at a determined speed, the welding being along a line that extends at least over the major portion of a width of each package, wherein said step of welding is performed with the welding apparatus according to claim 1.

12. The method according to claim 11, wherein a line of welding is made that extends over the entire width of each package.

13. The method according to claim 11, wherein while said line of welding is being made in each package, a line of cut is made simultaneously.

14. The method according to claim 11, wherein prior to closing each package by ultrasonic welding, said flanks of each package are heated so as to soften the inside faces of the flanks of each package.

15. The method according to claim 11, wherein each of said travelling packages is welded along a single line of welding or another line of welding situated beneath the first line of welding using another welding apparatus according to claim 1 placed downstream from the first welding apparatus, on the travel path of said packages.

16. The method according to claim 11, wherein the packages travel one after another at a travel speed that is constant and lies in the range of 20 m/min to 150 m/min.

17. The method according to claim 11, wherein the central layer of each flank of each package is made of aluminum.

18. The method according to claim 11, wherein the inside face of each flank of each package has a layer of polypropylene.

19. The method according to claim 11, wherein the inside face of each flank of each package has a layer of polyamide and a layer of polypropylene.

20. The method according to claim 11, wherein the outside face of each flank of each package comprises a layer of polyethylene terephthalate.

21. The method according to claim 20, wherein the outside face of each flank of each package comprises an additional layer of polyamide.

22. A flexible package, specifically intended to be subjected to conservation treatment, in particular after it has been filled and closed, the package having two flanks connected together via their side edges, each flank comprising an inside face and an outside face of plastics material and a central layer of light metal sandwiched between the inside and outside faces, wherein the package is closed in accordance with the method of claim 11.

* * * * *

UNITED STATES PATENT AND TRADEMARK OFFICE
CERTIFICATE OF CORRECTION

PATENT NO.     : 6,554,931 B1
DATED          : April 29, 2003
INVENTOR(S)    : Daniel Blanchard et al.

It is certified that error appears in the above-identified patent and that said Letters Patent is hereby corrected as shown below:

Column 4,
Line 11, "characteristics", should read -- characteristic --; and
Line 35, "detail" should read -- details --.

Column 6,
Line 44, "thank" should read -- thanks --; and
Line 50, "makes" should read -- make --.

Column 7,
Line 17, "in" should read -- in a --;
Line 18, "the" should read -- this --; and
Line 19, "saving" should read -- savings --.

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,554,931 B1
DATED : April 29, 2003
INVENTOR(S) : Daniel Blanchard et al.

It is certified that error appears in the above-identified patent and that said Letters Patent is hereby corrected as shown below:

Title page,
Item [73], Assignee, "Lieudit Saint Nicolas (FR)" should read -- Saint-Denis-de-íHotel (FR) --.

Column 7,
Line 17, "in" should read -- in a --;
Line 18, "the" should read -- this --; and
Line 19, "saving" should read -- savings --.

Signed and Sealed this

First Day of November, 2005

JON W. DUDAS
*Director of the United States Patent and Trademark Office*